(12) United States Patent
Wu et al.

(10) Patent No.: US 10,110,361 B2
(45) Date of Patent: Oct. 23, 2018

(54) SUBCHANNEL FEEDBACK FOR OFDMA SYSTEMS

(71) Applicants: MEDIATEK INC., Hsin-Chu (TW);
Tianyu Wu, San Jose, CA (US);
Jianhan Liu, San Jose, CA (US);
Kiran Uln, Pleasanton, CA (US);
Thomas Edward Pare, Jr., Mountain View, CA (US)

(72) Inventors: Tianyu Wu, San Jose, CA (US);
Jianhan Liu, San Jose, CA (US);
Kiran Uln, Pleasanton, CA (US);
Thomas Edward Pare, Jr., Mountain View, CA (US)

(73) Assignee: MEDIATEK INC., Hsin-Chu (TW)

( * ) Notice: Subject to any disclaimer, the term of this patent is extended or adjusted under 35 U.S.C. 154(b) by 22 days.

(21) Appl. No.: 15/123,247

(22) PCT Filed: Mar. 4, 2015

(86) PCT No.: PCT/US2015/018558
§ 371 (c)(1),
(2) Date: Sep. 1, 2016

(87) PCT Pub. No.: WO2015/134553
PCT Pub. Date: Sep. 11, 2015

(65) Prior Publication Data
US 2017/0063512 A1 Mar. 2, 2017

Related U.S. Application Data

(60) Provisional application No. 61/947,682, filed on Mar. 4, 2014.

(51) Int. Cl.
*H04L 5/00* (2006.01)
*H04L 25/02* (2006.01)
(Continued)

(52) U.S. Cl.
CPC ......... *H04L 5/0057* (2013.01); *H04B 7/0417* (2013.01); *H04B 7/0452* (2013.01);
(Continued)

(58) Field of Classification Search
CPC ...... H04B 7/024; H04B 17/24; H04B 17/309; H04B 17/0417; H04B 17/373;
(Continued)

(56) References Cited

U.S. PATENT DOCUMENTS

2009/0067531 A1 3/2009 Lee
2009/0225738 A1* 9/2009 Xu .................... H04W 72/0413
370/343
(Continued)

FOREIGN PATENT DOCUMENTS

EP 2 624 473 A2 8/2013

OTHER PUBLICATIONS

"International Search Report" dated Jun. 25, 2015 for International application No. PCT/US15/18558, International filing date: Mar. 4, 2015.
(Continued)

*Primary Examiner* — Mewale Ambaye
(74) *Attorney, Agent, or Firm* — Winston Hsu (57) ABSTRACT

A method of sub-channel feedback in OFDMA systems is provided. A wireless receiving device (STA) receives a radio signal from a transmitting device (AP) over a wide channel in an OFDMA system. The radio signal is transmitted over multiple sub-channels of the wide channel. The STA estimates channel quality information based on the received radio signal for each sub-channel. The STA then sends feedback information to the transmitting device. The feedback information comprises the estimated channel quality information for a selected subset of sub-channels from the wide channel based on a predefined rule. In one embodi-
(Continued)

ment, the feedback information is embedded within an ACK/BA frame or is carried in a frame immediately subsequent to the ACK/BA frame.

15 Claims, 6 Drawing Sheets

(51) Int. Cl.
*H04B 17/24* (2015.01)
*H04B 17/336* (2015.01)
*H04B 7/0452* (2017.01)
*H04B 7/06* (2006.01)
*H04L 1/16* (2006.01)
*H04B 7/0417* (2017.01)
*H04W 72/04* (2009.01)
*H04W 72/08* (2009.01)

(52) U.S. Cl.
CPC ......... *H04B 7/0623* (2013.01); *H04B 7/0626* (2013.01); *H04B 7/0632* (2013.01); *H04B 17/24* (2015.01); *H04B 17/336* (2015.01); *H04L 1/1671* (2013.01); *H04L 5/0023* (2013.01); *H04L 5/0048* (2013.01); *H04L 25/0204* (2013.01); *H04W 72/0446* (2013.01); *H04W 72/082* (2013.01); *H04L 1/1685* (2013.01)

(58) Field of Classification Search
CPC ... H04W 40/12; H04W 36/30; H04W 72/082; H04W 72/0446
See application file for complete search history.

(56) References Cited

U.S. PATENT DOCUMENTS

| | | | | |
|---|---|---|---|---|
| 2009/0323848 | A1* | 12/2009 | Guthy | H04B 7/0426 375/267 |
| 2010/0232384 | A1* | 9/2010 | Farajidana | H04L 5/005 370/329 |
| 2011/0261708 | A1* | 10/2011 | Grandhi | H04W 4/06 370/252 |
| 2013/0010632 | A1* | 1/2013 | Wang | H04B 17/24 370/252 |
| 2013/0148600 | A1 | 6/2013 | Moulsley | |

OTHER PUBLICATIONS

Part 11: Wireless LAN Medium Access Control(MAC) and Physical Layer (PHY) Specifications Amendment 4: Enhancements for Very High Throughput for Operation in Bands below 6 GHz, IEEE Standard for Information technology—Telecommunications and information exchange between systems Local and metropolitan area networks-Specific requirements, Dec. 11, 2013, XP068113040.
Part 11: Wireless LAN Medium Access Control(MAC) and Physical Layer (PHY) Specifications Redline, IEEE Standard for Information technology-Telecommunications and information exchange between systems Local and metropolitan area networks-Specific requirements, Mar. 29, 2012, XP068055767.
Texas Instruments, CQI Feedback Reduction Scheme for E-UTRA, 3GPP TSG RAN WG1 50bis, R1-074153, Oct. 8-12, 2007, pp. 1-7, Shanghai, China, XP050107685.
Alcatel-Lucent, Periodic "best-M" CQI Reporting Scheme, 3GPP TSG-RAN#51 WG 1 LTE, R1-074983, Nov. 5-9, 2007, pp. 1-7, Jeju, Korea, XP050108434.

* cited by examiner

| Sub channel 1 | SNR 1 | Channel matrix V for subcarrier 1 of sub channel 1 | ... | Channel matrix V for subcarrier K of sub channel 1 |
|---|---|---|---|---|
| Sub channel 2 | SNR 2 | Channel matrix V for subcarrier 1 of sub channel 2 | ... | Channel matrix V for subcarrier K of sub channel 2 |

SUBCHANNEL FEEDBACK FOR OFDMA SYSTEMS

CROSS REFERENCE TO RELATED APPLICATIONS

This application claims priority under 35 U.S.C. § 119 from U.S. Provisional Application No. 61/947,682, entitled "Sub Channel Feedback for OFDMA System," filed on Mar. 4, 2014, the subject matter of which is incorporated herein by reference.

TECHNICAL FIELD

The disclosed embodiments relate generally to wireless network communications, and, more particularly, to feedback process in wireless communications systems.

BACKGROUND

In IEEE 802.11 wireless systems, channel sounding and feedback process is commonly used for channel estimation. In MIMO systems, each channel sounding and feedback process is followed by a series of MIMO frame exchange. During channel sounding and feedback, a transmitting device (initiator) sends a sounding announcement (e.g., null data packet announcement (NDPA)) followed by a sounding packet (e.g., null data packet (NPD)) to a receiving device (responder) participating in the process. The responder estimates the channel during the preamble portion of the sounding packet. The responder then feedbacks the average SNR (signal-to-noise ratio) and CSI (channel state information) to allow the initiator to compute the transmit antenna (precoding) weights for MIMO transmission. Feedback packet may also include other channel quality metrics such as MCS, BER, SNR/SINR, and mutual information.

Feedback of accurate channel quality information such as SNR and MCS allows the transmitter to make correct decision regarding transmission bandwidth adjustment as well as MCS adaptation to improve system performance. In current implementation, channel quality information is provided based on a fixed sub-channel (e.g., the sounding bandwidth) and obtained through a sounding and feedback protocol. The channel conditions, however, could be significantly different in different sub-channels due to frequency selective fading. To have channel quality information for all sub-channels, multiple requests and feedbacks are required. This leads to increased system overhead and channel contention.

In orthogonal frequency division multiple access (OFDMA) systems, frequency division multiple access is achieved by assigning different OFDM sub-channels to different users. OFDMA design can benefit from multiuser diversity gain. CSI feedback for multiple users are required to achieve multiuser diversity gain. However, the existing CSI/SNR feedback scheme does not work due to large feedback overhead. For example, the compressed CSI feedback has very large overhead. On the other hand, SNR feedback only provides feedback for average SNR over data subcarriers and space-time streams. It cannot provide SNR on sub-channels.

A solution is sought to provide sub-channel SNR feedback and CSI reporting with reduced overhead and channel contention.

SUMMARY

A method of sub-channel feedback in OFDMA systems is provided. A wireless receiving device (STA) receives a radio signal from a transmitting device (AP) over a wide channel in an OFDMA system. The radio signal is transmitted over multiple sub-channels of the wide channel. The STA estimates channel quality information based on the received radio signal for each sub-channel. The STA then sends feedback information to the transmitting device. The feedback information comprises the estimated channel quality information for a selected subset of sub-channels from the wide channel based on a predefined rule. The channel quality information comprises an average signal to noise ratio (SNR) of a selected sub-channel, or a sum throughput of all spatial streams of the selected sub-channel. In one embodiment, the selected subset of sub-channels is based on a predefined channel quality threshold. In another embodiment, the selected subset of sub-channels is based on a predefined number of sub-channels having the best channel quality. In yet another embodiment, the feedback information is embedded within an ACK/BA frame or is carried in a frame immediately subsequent to the ACK/BA frame.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
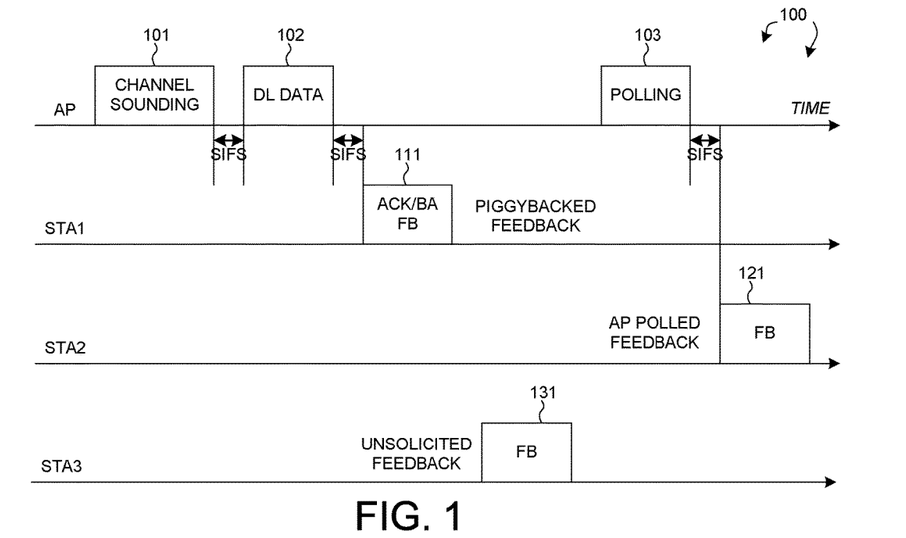
FIG. 1 illustrates a channel sounding and feedback process with sub-channel SNR feedback in a wireless system in accordance with one novel aspect.

FIG. 1 illustrates a channel sounding and feedback process with sub-channel SNR feedback in a wireless system 100 in accordance with one novel aspect. Wireless system 100 comprises a transmitting device (e.g., an access point AP) and a plurality of receiving devices (e.g., non-AP stations STA1, STA2, and STA3). During channel sounding 101, transmitting device AP sends a sounding announcement (e.g., null data packet announcement (NDPA) not shown) followed by a sounding packet (e.g., null data packet (NDP) not shown) to receiving devices STA1-STA3. The NDPA is transmitted first to inform the intended receiving device (e.g., via STA INFO fields) and the NDP is then transmitted for the intended receiving devices to estimate the channel. For example, in the NDP, the L-STF, L-LTF, L-SIG fields are used for setting up the protection field against legacy devices. The signaling information for the NDP signal is carried in the VHT-SIG-A and the channel estimation is performed on the LTFs (long training fields). After channel sounding 101, transmitting device AP also sends a downlink (DL) data packet 102 to STA1. Typically, the channel sounding 101 is sent over a wide channel. In an OFDMA system, the DL data packet 102 is sent to multiple users over different sub-channels.

Channel sounding and feedback is a procedure to support transmit beamforming and fast link adaptation. Feedback on accurate channel quality information such as accurate SNR/MCS information allows the transmitter to make correct decision regarding the transmission bandwidth as well as MCS adaptation to improve system performance. Moreover, in OFDMA systems, CSI (channel state information) feedback from multiple users are required to achieve multiuser diversity gain.

In the current IEEE 802.11 implementation, the feedback information is provided based on the current channel bandwidth. For example, SNR/MCS feedback is provided for either 20 MHz or 40 MHz depending on the sounding packet. If the sounding signal occupies 40 MHz, then the SNR/MCS feedback is provided for 40 MHz. The same SNR/MCS feedback is assumed valid for 20 MHz sub-channel. Such approach is not sufficient for wireless systems where the transmission bandwidth can range from 160 MHz to 20 MHz. This is because the channel conditions could be significantly different in different sub-channels due to frequency selective fading. In OFDMA systems, a sub-channel bandwidth is around 2 MHz. As a result, there will be 40 sub-channels for 80 MHz WLAN wide channel and 80 sub-channels for 160 MHz WLAN wide channel. To have SNR information for all sub-channels, multiple requests and feedbacks are required. This leads to increased system overhead and channel contention.

In one novel aspect, sub-channel SNR feedback is proposed to facilitate and to improve the performance in OFDMA systems. The receiver provides SNR feedback information for a subset of all the sub-channels based on a predefined condition. Different feedback schemes are also proposed. In a first embodiment, a piggybacked feedback scheme is proposed. For example, STA1 sends an acknowledgement (ACK) or block ACK (BA) frame 111 in response to the DL data packet 102. The SNR sub-channel feedback information is embedded within the ACK/BA frame 111 to reduce channel contention. In a second embodiment, AP-polled feedback scheme is used. For example, AP sends a polling frame 103. In response, STA2 sends a feedback frame 121 back to the AP. In a third embodiment, unsolicited feedback scheme is used. For example, STA3 simply sends a feedback frame 131 to the AP without solicitation. Note that although channel sounding (101) is illustrated in FIG. 1 for channel estimation purpose, LTFs for channel sounding can be sent after OFDMA format data traffic (e.g., DL DATA 102). It is thus possible for the STAs to provide feedback information without a separate channel sounding procedure.

Figure 2:
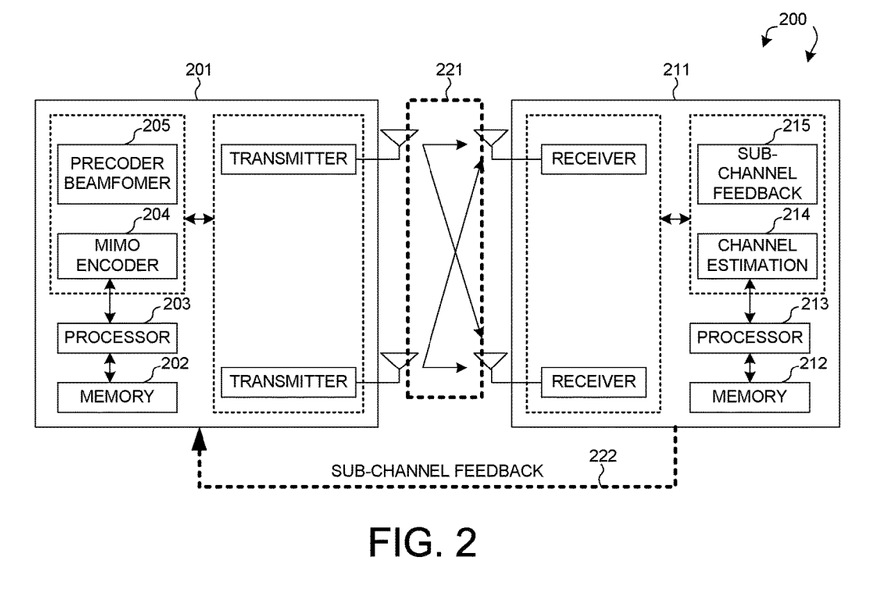
FIG. 2 illustrates a wireless system with sub-channel SNR feedback in accordance with one novel aspect.

FIG. 2 illustrates a wireless system 200 with sub-channel SNR feedback in accordance with one novel aspect. Wireless system 200 comprises a transmitting device 201 and a receiving device 211 communicating with each other via a wireless SU-MIMO channel 221. Transmitting device 201 comprises memory 202, a processor 203, a MIMO encoder 204, a beamformer/precoder 205, and a plurality of transmitters coupled to a plurality of antennas, respectively. Receiving device 211 comprises memory 212, a processor 213, a channel estimation module 214, a sub-channel feedback module 215, and a plurality of receivers coupled to a plurality of antennas, respectively. SU-MIMO channel 221 is formed by the plurality of transmitting antennas of transmitting station 201 and the plurality of receiving antennas of receiving station 211. Those skilled in the art would realize that "antenna" is used in a logical context, and may not necessarily be referred to as the physical antenna structure. SU-MIMO communication promises large gains for both channel capacity and reliability, essentially via the use of spatial-time codes and transmit beamforming (diversity gain oriented) combined with spatial stream multiplexed transmission (rate maximization oriented). Although SU-MIMO channel is illustrated in FIG. 2, the present invention is not limited to SU-MIMO. In OFDMA systems, MU-MIMO over different sub-channels may also be supported.

The various function modules may be implemented and configured by software, firmware, hardware, and any combination thereof. The function modules, when executed by the processors (via program instructions contained in the memory), interwork with each other to allow the transmitting and receiving devices to perform certain embodiments of the present invention accordingly. For example, at the transmitter side, transmitting device 201 transmits a sounding signal to receiving device 211. At the receiver side, receiving device 211 estimates the channel based on the received sounding signal. The receiving device 211 then feedbacks the sub-channel SNR (signal-to-noise ratio) and CSI (channel state information) to the transmitting device 201 via a feedback channel 222. The feedback information comprises SNR/CSI information for a subset of all the sub-channels based on a predefined condition to reduce overhead.

Figure 3:
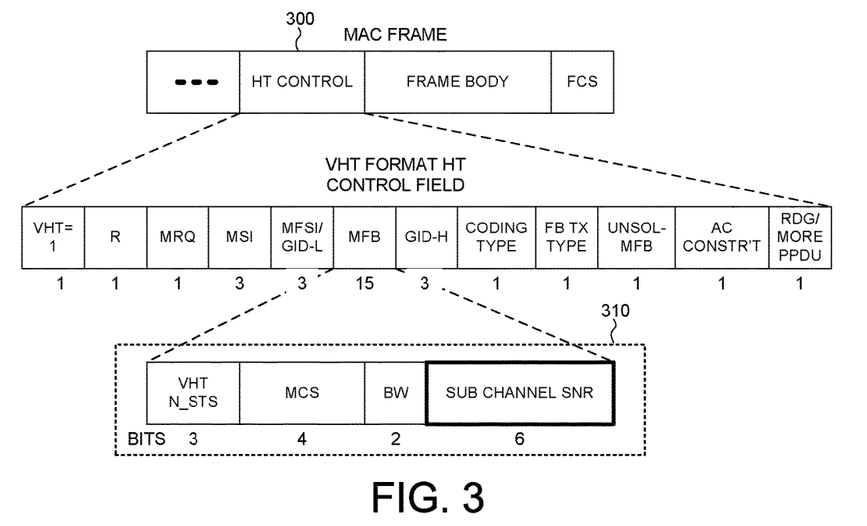
FIG. 3 illustrates a novel feedback frame format in an IEEE 802.11ac wireless system.

FIG. 3 illustrates a novel feedback frame format in an IEEE 802.11 wireless system. In the example of FIG. 3, a MAC frame 300 contains a HT (high throughput) control field, which further contains an MCS request (MRQ) subfield, an MCS sequence identifier (MSI) subfield, an MFB sequence identifier/LSB of Group ID (MFSI/GID-L) subfield, a VHT N_STS, MCS, BW and SNR feedback (MFB) subfield, an MSB of Group ID (GID-H) subfield, coding type of MFB response (Coding Type) subfield, transmission type of MFB response (FB Tx Type) subfield, unsolicited MFB subfield, AC constraint subfield, and RDG/More PPDU subfield. The MFB subfield 310 further contains a number of spatial streams (N_STS) subfield, an MCS subfield, a bandwidth (BW) subfield, and an SNR subfield.

When MFB is requested, the MFB subfield contains the number of spatial streams, modulation and coding scheme, data transmission rate, bandwidth, and SNR information. In the example of FIG. 3, the receiving device provides the MFB subfield feedback information for a subset of sub-channels of a 160 MHz wide channel. The MFB subfield 310 contains SNR information for the corresponding sub-channels. Various solutions for sub-channel SNR feedback is now described below.

Figure 4:
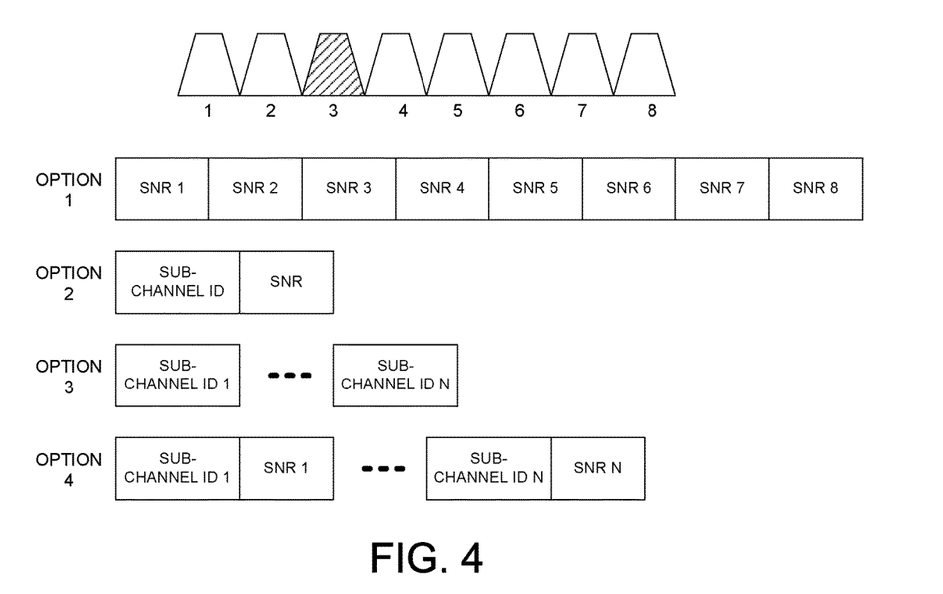
FIG. 4 illustrates transmission sub-channels in a wireless system and examples of sub-channel SNR feedback.

FIG. 4 illustrates transmission sub-channels in a wireless system and examples of sub-channel SNR feedback. In the example of FIG. 4, the wide channel contains total eight transmission sub-channels in the system, indexed from 1 to 8. In a first solution, each STA feedback SNRs on all sub-channels, as depicted by option 1. If 8 bits are used for SNR on each sub-channel, then only 64 bits needed for sub-channel SNR feedback. For MIMO system with more than one spatial stream, the STA may feedback average SNR over all spatial streams on each sub-channel. Alternatively, the STA may feedback the sum throughput of all spatial streams on each sub-channel. In a second solution, to further decrease the feedback overhead, each STA feedback the SNR followed by a sub-channel ID on the best sub-channel only (e.g., sub-channel #3), as depicted by option 2. The system throughput under solution 2 will decrease as compared to solution 1.

In a third solution, each STA feedback the sub-channel CSI with SNR over a predefined threshold. The threshold of each sub-channel can be a given number so that a particular MCS can be achieved. Each STA only feedback the indices of the sub-channels, as depicted by option 3. The STA can feedback the sub-channel indices as well as the corresponding SNR. The threshold can also be determined by AP. For example, the AP decides the threshold on each sub-channel based on the current max SNR of each sub-channel or based on the SNR of the serving STA on each sub-channel. The AP can choose a smaller threshold to guarantee that at least one STA will send a feedback to the AP on each sub-channel. In a fourth solution, each STA feedback SNR on N best sub-channels or SNR on N worst sub-channels, as depicted by option 4, where N is a predefined number (e.g., N=3). Note that in all solutions, SNR can be replaced by recommended MCS.

Figure 5:
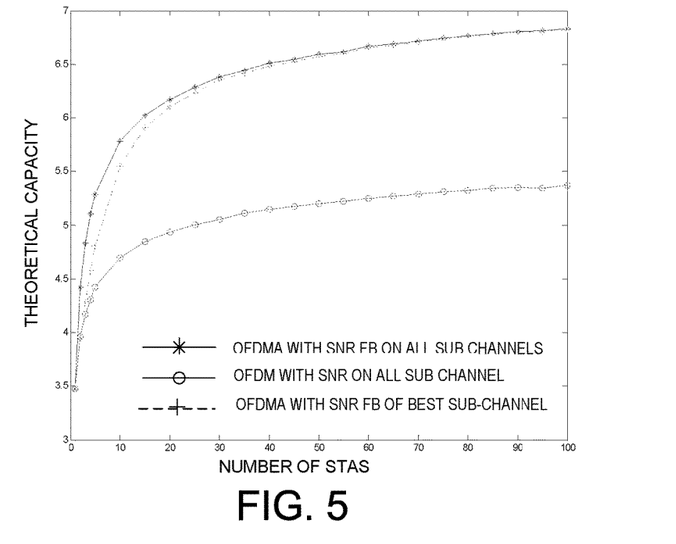
FIG. 5 illustrates the theoretical capacity in an OFDM/OFDMA wireless system with SNR sub-channel feedback.

FIG. 5 illustrates the theoretical capacity in an OFDM/OFDMA wireless system with SNR sub-channel feedback. As depicted in FIG. 5, simulation results show that only feedback the SNR on the best sub-channel can already achieve 80% throughput gain with 10 STAs and 95% throughput gain with 20 STAs.

Figure 6:
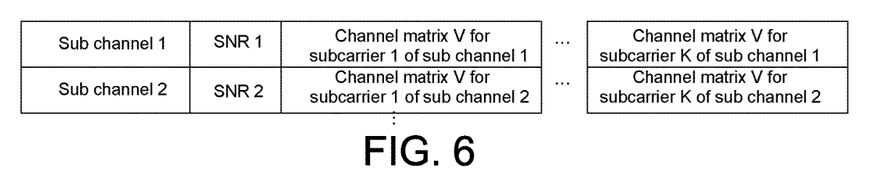
FIG. 6 illustrates SNR sub-channel feedback in OFDMA systems supporting MU-MIMO.

FIG. 6 illustrates SNR sub-channel feedback in OFDMA systems supporting MU-MIMO. For OFDMA systems supporting MU-MIMO on each sub-channel, the maximum system throughput for each sub-channel may be given by MU-MIMO. For example, it may be optimal to transmit on the strongest spatial streams to different STAs. The transmitter needs more feedback information to support MU-MIMO in a sub-channel. In order for the AP to select the users, feedback of the average SNR over all spatial streams or feedback of the sum throughput of all spatial streams may not be enough. Instead, the SNR of each spatial stream are needed. The direction of each spatial stream are also needed. The STA can choose to feedback the information only on several strongest spatial streams. The direction of the spatial stream can be the right singular vector of the corresponding spatial stream. The SNR and the direction of the spatial stream can also be replaced by compressed channel matrix. In the example of FIG. 6, for each sub-channel, the feedback information comprises the average SNR, plus the compressed channel matrix V for the strongest K subcarriers.

Figure 7:
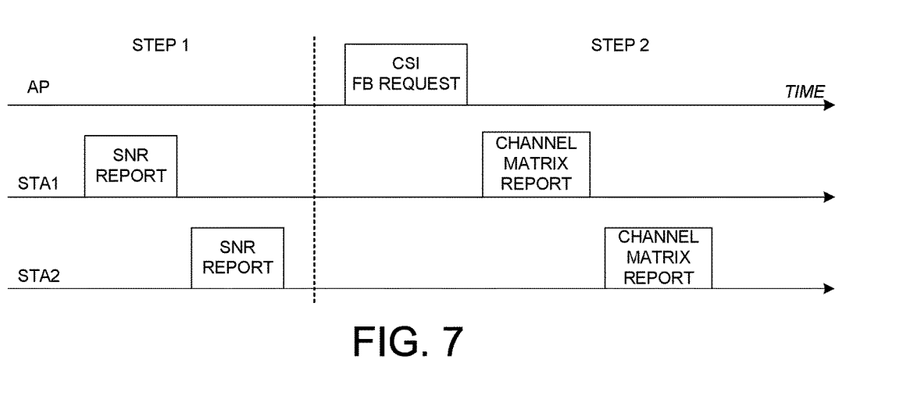
FIG. 7 illustrates a two-step SNR sub-channel feedback method in OFDMA MU-MIMO systems.

FIG. 7 illustrates a two-step SNR sub-channel feedback method in OFDMA MU-MIMO systems to further reduce feedback overhead. In the example of FIG. 7, in step 1, the AP receives sub-channel SNR report from both STA1 and STA2. For example, the SNR report includes the average SNR over all spatial streams or the sum throughput of all spatial streams for each sub-channel. In step 2, based on the SNR report, the AP selects the STAs and sub-channels with good average SNR or high sum throughput and request detailed CSI feedback over those selected sub-channels. The detailed CSI feedback includes the compressed channel matrix of the sub-channels or per stream SNR and direction of the spatial streams of the sub-channels as explained in the previous paragraph.

In WLAN systems, the feedback overhead includes two parts: the CSI reporting overhead, and the channel contention overhead. With large number of STAs, the feedback overhead will be large. The above-proposed sub-channel SNR feedback design will dramatically decrease the CSI reporting overhead. However, channel contention overhead for CSI reporting can still be large. A new feedback scheme with low channel contention overhead is thus desired.

Figure 8:
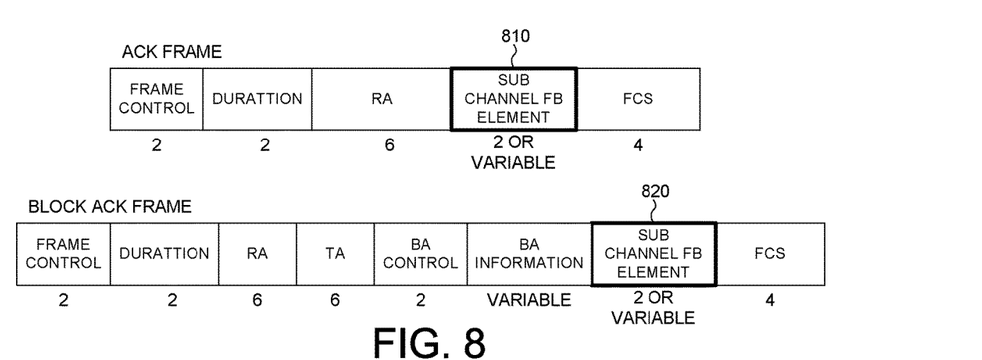
FIG. 8 illustrates a novel acknowledgement frame and a novel block acknowledgement frame with piggybacked SNR sub-channel feedback.

FIG. 8 illustrates a novel acknowledgement (ACK) frame and a novel block acknowledgement (BA) frame with piggybacked SNR sub-channel feedback. In one novel aspect, the feedback information may be piggybacked within an ACK or BA frame to reduce channel contention overhead. Since an STA often needs to respond to AP with ACK or BA frame for received DL data frames, by embedding the feedback information into the ACK frame or the BA frame, the additional channel contention for sending feedback information can be omitted. In the example of FIG. 8, ACK frame 810 comprises a frame control field, a duration, RA, a novel sub-channel FB element, and a Frame checksum (FCS). Block ACK frame 820 comprises a frame control field, a duration, RA, TA, a BA control field, BA information, a novel sub-channel FB element, and a frame checksum (FCS). For example, the sub-channel FB element can have any of the formats as illustrated earlier with respect to FIG. 4.

Figure 9:
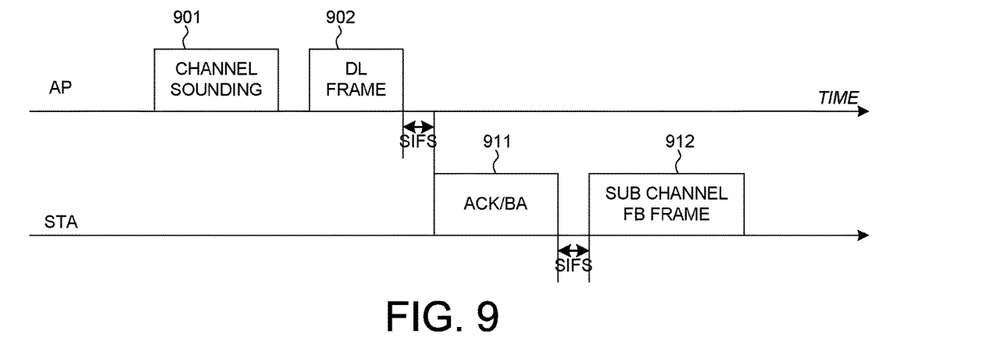
FIG. 9 illustrates one embodiment of a SNR sub-channel feedback frame after ACK/BA frame.

FIG. 9 illustrates one embodiment of sending a separate SNR sub-channel feedback frame after ACK/BA frame. As an alternative to piggybacked feedback, an STA may send a separate feedback frame after the ACK/BA frame. In the example of FIG. 9, the AP first sends a channel-sounding frame 901, followed by a DL data frame 902 to the STA. The STA responds an ACK/BA frame 911 to the AP. After a short inter-frame space (SIFS), the STA also sends a feedback frame 912 that contains sub-channel SNR feedback information to the AP.

In some situation, an STA may not have chance to send ACK/BA frame to the AP. Therefore, other mechanisms for sub-channel feedback shall also be provided. In one embodiment, unsolicited feedback mechanism may be used. The STA can initiate the sub-channel CSI feedback without AP solicitation, as depicted earlier for SAT3 in FIG. 1. The sub-channel feedback information can be carried in a modified MFB element, as depicted earlier in MFB 310 of MAC frame 300 in FIG. 3.

Figure 10:
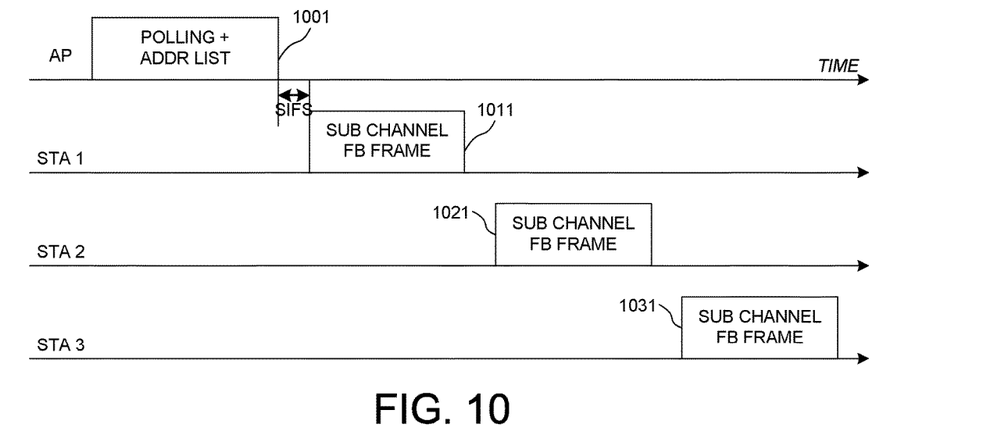
FIG. 10 illustrates another embodiment of SNR sub-channel feedback in response to polling.

FIG. 10 illustrates another embodiment of SNR sub-channel feedback in response to polling. In the example of FIG. 10, AP first sends a polling frame 1001 to a plurality of STAs. The polling frame contains a list of STA addresses of the polled STAs, e.g., STA1, STA2, and STA3. Upon receiving the polling frame, STA1 sends a sub-channel FB frame 1011 back to the AP, STA2 sends a sub-channel FB frame 1021 back to the AP, and STA3 sends a sub-channel FB frame 1031 back to the AP. The sub-channel FB frames contain SNR/CSI information of a subset of all the sub-channels.

Figure 11:
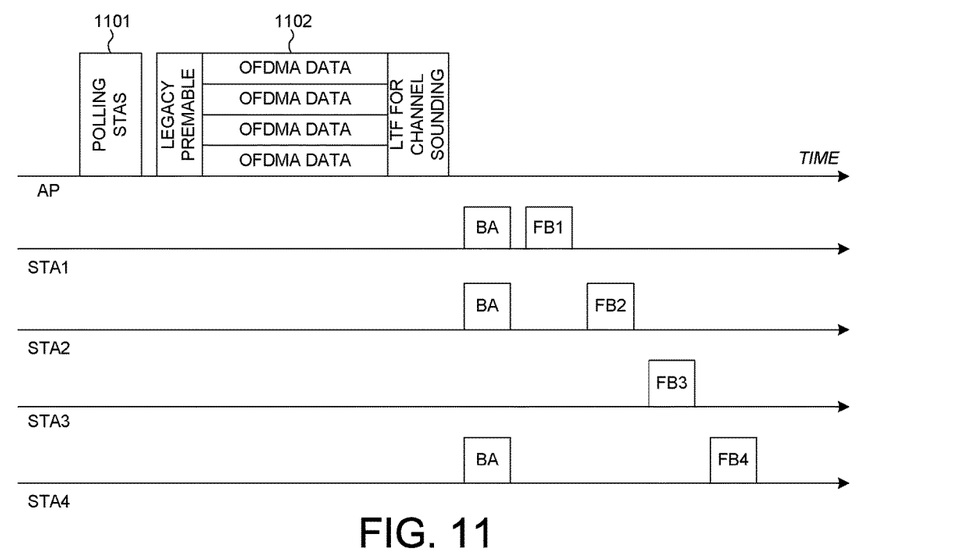
FIG. 11 illustrates one embodiment of SNR sub-channel feedback after polling and OFDMA data transmission.

FIG. 11 illustrates one embodiment of SNR sub-channel feedback after polling and OFDMA data transmission. In the example of FIG. 11, the AP first sends a polling frame 1101 in OFDMA format, polling a list of target STAs for feedback information. The AP then sends an OFDMA data frame 1102. The structure of the OFDMA data packet contains a legacy preamble, OFDMA data over various sub-channels, and LTFs for channel sounding. The OFDMA data frame is for certain STAs, e.g., STA1, STA2, and STA4. Upon receiving the OFDMA data frame, the corresponding STAs send OFDMA format ACK/BA frames back to the AP. After sending the ACK/BA frames, the target STAs listed in the polling frame send the CSI/SNR feedback (FB) in the order specified in the address list (e.g., FB1, FB2, FB3, and FB4). Alternatively, the FB frames may be sent using OFDMA format as well.

Figure 12:
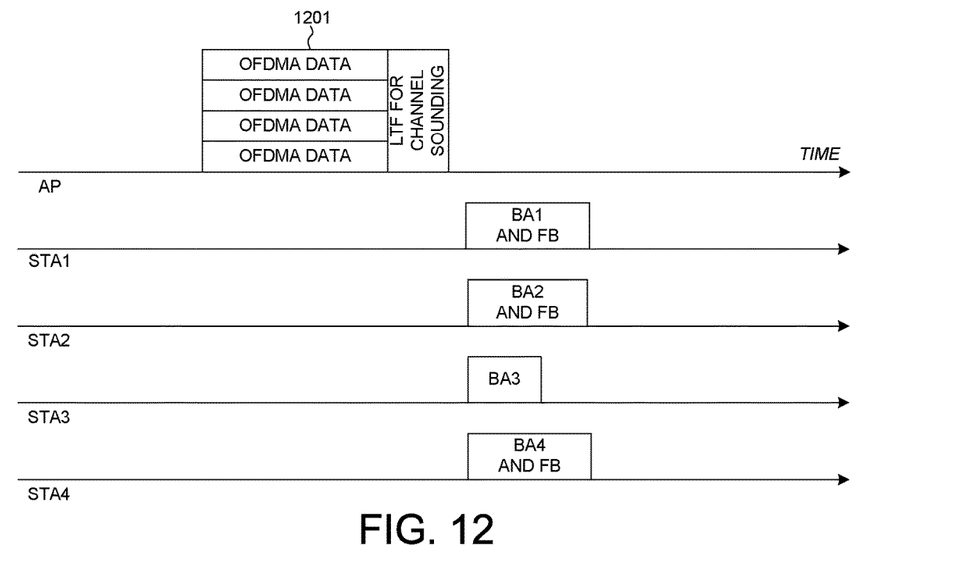
FIG. 12 illustrates another embodiment of piggybacked SNR sub-channel feedback after OFDMA data transmission

FIG. 12 illustrates another embodiment of piggybacked SNR sub-channel feedback after OFDMA data transmission. In the example of FIG. 12, the AP only request STAs involved in the current OFDMA transmission to feedback the sub-channel SNR. In this way, the SNR information can be piggybacked in the ACK/BA frame. The AP does not need to send a separate polling frame. Instead, the AP only needs a signaling bit to signal the target STAs for sub-channel SNR feedback indication. For example, the AP can use one reserved bit in HT control middle subfield for such indication. As illustrated in FIG. 12, AP first sends OFDMA data frame 1201 over various sub-channels followed by LTFs for channel sounding. The recipient STAs reply with OFDMA format ACK/BA frames back to the AP. For STAs with FB signaling indication, e.g., STA1, STA2, and STA4, the ACK/BA frames are also embedded with sub-channel SNR feedback information.

Figure 13:
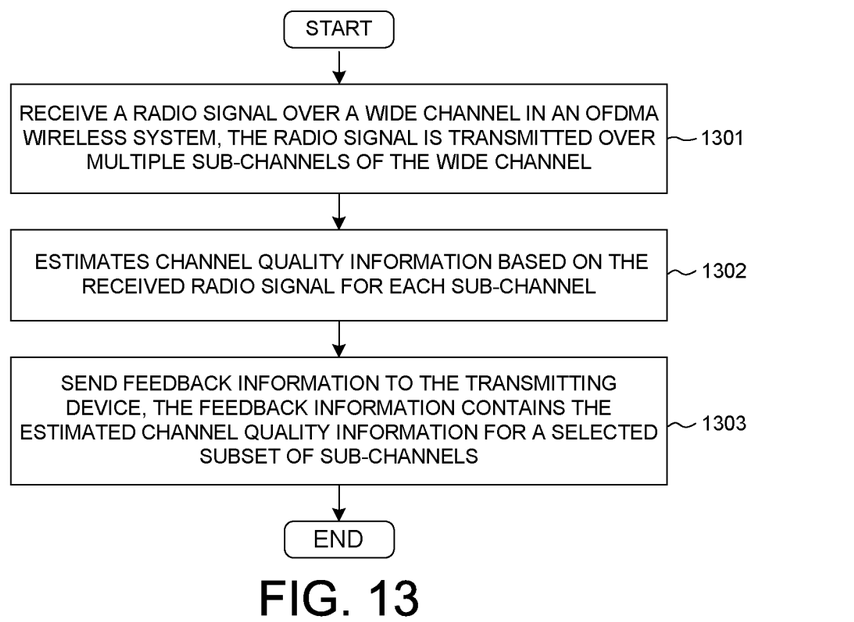
FIG. 13 is a flow chart of a method of transmitting SNR sub-channel feedback in a wireless communication system.

FIG. 13 is a flow chart of a method of transmitting SNR sub-channel feedback in an OFDMA wireless communication system. In step 1301, a wireless receiving device (STA) receives a radio signal from a transmitting device (AP) over a wide channel. The radio signal is transmitted over multiple sub-channels of the wide channel. In step 1302, the STA estimates channel quality information based on the received radio signal for each sub-channel. In step 1303, the STA sends feedback information to the transmitting device. The feedback information comprises the estimated channel quality information for a selected subset of sub-channels from the wide channel based on a predefined rule. The channel quality information comprises an average signal to noise ratio (SNR) of a selected sub-channel, or a sum throughput of all spatial streams of the selected sub-channel. In one embodiment, the selected subset of sub-channels is based on a predefined channel quality threshold. In another embodiment, the selected subset of sub-channels is based on a predefined number of sub-channels having the best channel quality. In yet another embodiment, the feedback information is embedded within an ACK/BA frame or is carried in a frame immediately subsequent to the ACK/BA frame.

Figure 14:
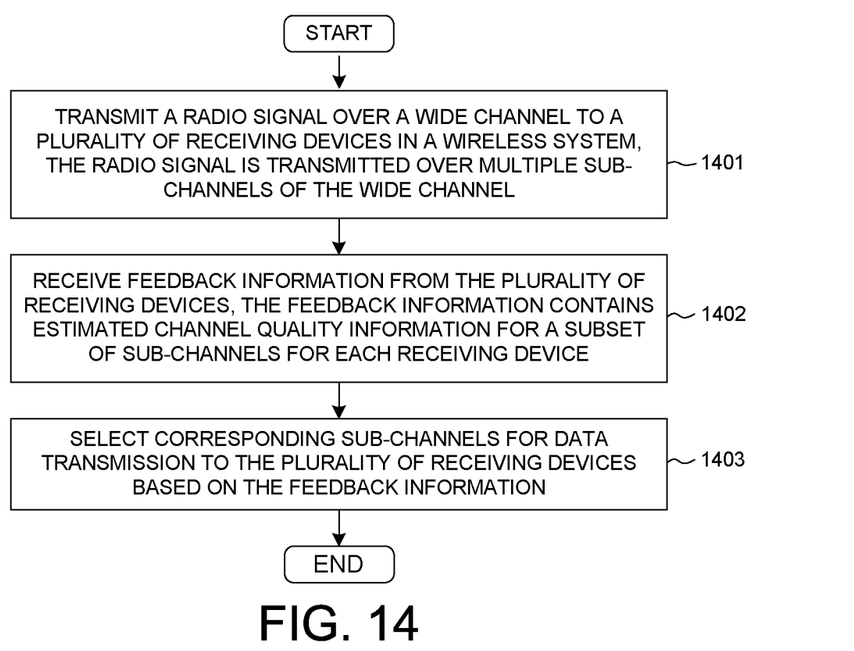
FIG. 14 is a flow chart of a method of receiving SNR sub-channel feedback in a wireless communication system.

FIG. 14 is a flow chart of a method of receiving SNR sub-channel feedback in a wireless communication system. In step 1401, a transmitting device (AP) transmits a radio signal over a wide channel to a plurality of receiving devices (STAs). The radio signal is transmitted over multiple sub-channels of the wide channel. In step 1402, the AP receives feedback information from the STAs. The feedback information contains estimated channel quality information for a subset of sub-channels from the wide channel for each STA. In step 1403, the AP selects corresponding sub-channels for data transmission to the STAs based on the feedback information. In one embodiment, the AP may determine a channel quality threshold such that at least one STA will send a feedback to the AP on each sub-channel. In another embodiment, the AP may select the STAs with good average SNR/sum throughput and request for detailed CSI feedback for MU-MIMO data transmission.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   (a) receiving a radio signal transmitted from a transmitting device over a wide channel by a receiving device in an Orthogonal Frequency Division Multiple Access (OFDMA) wireless system, wherein the radio signal is transmitted over multiple sub-channels of the wide channel;
   (b) estimating channel quality information based on the received radio signal for each sub-channel;
   (c) sending feedback information to the transmitting device, wherein the feedback information contains the estimated channel quality information for a selected subset of sub-channels from the wide channel based on a predefined rule;
   receiving a channel state information (CSI) feedback request for a Multi-user multiple-input and multiple-output (MU-MIMO) sub-channel; and
   sending a channel matrix report of the MU-MIMO sub-channel;
   wherein the selected subset of sub-channels is based on a predefined channel quality threshold, or the selected subset of sub-channels is based on a predefined number of sub-channels having the best channel quality.

2. The method of claim 1, wherein the channel quality information comprises an average signal to noise ratio (SNR) of a selected sub-channel.

3. The method of claim 1, wherein the channel quality information comprises a sum throughput of all spatial streams in a selected sub-channel.

4. The method of claim 1, wherein the radio signal contains both OFDMA data field for multiple sub-channels and multiple training fields for channel sounding.

5. The method of claim 1, wherein the feedback information is carried in an acknowledgement (ACK) frame or a block acknowledgement (BA) frame.

6. The method of claim 1, wherein the feedback information is carried in a frame immediately subsequent to an ACK frame or a BA frame.

7. A wireless station, comprising:
   a receiver that receives a radio signal transmitted from a transmitting device over a wide channel in an Orthogonal Frequency Division Multiple Access (OFDMA) wireless system, wherein the radio signal is transmitted over multiple sub-channels of the wide channel;
   a channel estimation module that estimates channel quality information based on the received radio signal for each sub-channel;
   a transmitter that sends feedback information to the transmitting device, wherein the feedback information contains the estimated channel quality information for a selected subset of sub-channels from the wide channel based on a predefined rule;
   the receiver that receives a channel state information (CSI) feedback request for a Multi-user multiple-input and multiple-output (MU-MIMO) sub-channel; and
   the transmitter that sends a channel matrix report of the MU-MIMO sub-channel;
   wherein the selected subset of sub-channels is based on a predefined channel quality threshold, or the selected subset of sub-channels is based on a predefined number of sub-channels having the best channel quality.

8. The station of claim 7, wherein the channel quality information comprises an average signal to noise ratio (SNR) of a selected sub-channel.

9. The station of claim 7, wherein the feedback information is carried in an acknowledgement (ACK) frame or a block acknowledgement (BA) frame.

10. The station of claim 7, wherein the feedback information is carried in a frame immediately subsequent to an ACK frame or a BA frame.

11. A method, comprising:
(a) transmitting a radio signal from a transmitting device to a plurality of receiving devices over a wide channel in an Orthogonal Frequency Division Multiple Access (OFDMA) wireless system, wherein the radio signal is transmitted over multiple sub-channels of the wide channel;
(b) receiving feedback information from the plurality of receiving devices, wherein the feedback information contains the estimated channel quality information for a subset of sub-channels from the wide channel for each receiving device;
(c) selecting corresponding sub-channels for data transmission to the plurality of receiving devices based on the feedback information;

determining a channel quality threshold such that the channel quality of each sub-channels from the subset of sub-channels is above the threshold, or the subset of sub-channels comprises a predetermined number of sub-channels having the best channel quality;

transmitting a channel state information (CSI) feedback request for a Multi-user multiple-input and multiple-output (MU-MIMO) sub-channel; and receiving a channel matrix report of the MU-MIMO sub-channel.

12. The method of claim 11, the channel quality information comprises an average signal to noise ratio (SNR) of a selected sub-channel.

13. The method of claim 11, wherein the radio signal contains both OFDMA data field for multiple sub-channels and multiple training fields for channel sounding.

14. The method of claim 11, wherein the feedback information is carried in an acknowledgement (ACK) frame or a block acknowledgement (BA) frame.

15. The method of claim 11, wherein the feedback information is carried in a frame immediately subsequent to an ACK frame or a BA frame.

* * * * *